Nov. 8, 1955

C. M. MINER ET AL 2,722,763

ELECTRIC BOBBER

Filed Sept. 3, 1953

Charles M. Miner
Louis I. South
INVENTORS.

BY *Clarence A. O'Brien*
*and Harvey B. Jacobson*
Attorneys

# United States Patent Office 2,722,763
Patented Nov. 8, 1955

2,722,763
ELECTRIC BOBBER
Charles M. Miner and Louis I. South, Wichita, Kans.

Application September 3, 1953, Serial No. 378,256

4 Claims. (Cl. 43—17)

This invention relates to a fishing bobber and particularly to a fishing bobber having an electrically actuated signal light therein for informing the angler when a fish is nibbling or swallowing the bait.

Anglers frequently find it desirable to fish at night and one using a bobber for fishing purposes to determine the activity of the fish find it extremely difficult to see the bobber at night and consequently fish may be lost because of improper handling of the tackle because of failure to see the activity of the fish.

The present invention provides a bobber adapted to be mounted on a fishing line and having an electrical illuminating device mounted therein with suitable batteries and switching devices responsive to the activity of the fish for causing illumination of the illuminating device so that the angler may have complete information concerning the activity of the fish with his bait.

This is accomplished by providing a floating body having an aperture therein and a casing mounted in the aperture carrying a battery or batteries and a lamp to be illuminated thereby together with a pressure control switch adapted to be mounted on the line so that the activities of the fish in engaging the bait will cause actuation of the illuminating device. The floater is preferably made of a transparent or translucent material so that the illumination may be readily observed therethrough. If desired the transparent material may be colored to aid in the observation of the illuminating device.

Accordingly, it is an object of the invention to provide an improved fishing bobber.

It is a further object of the invention to provide an illuminating fishing bobber.

It is a further object of the invention to provide an electrically operated fishing bobber in which the battery compartment may be readily disassociated from the bobber for the renewal of batteries or other purposes.

It is a further object of the invention to provide an improved pressure switch for actuating the electrical bobber.

Figure 1:
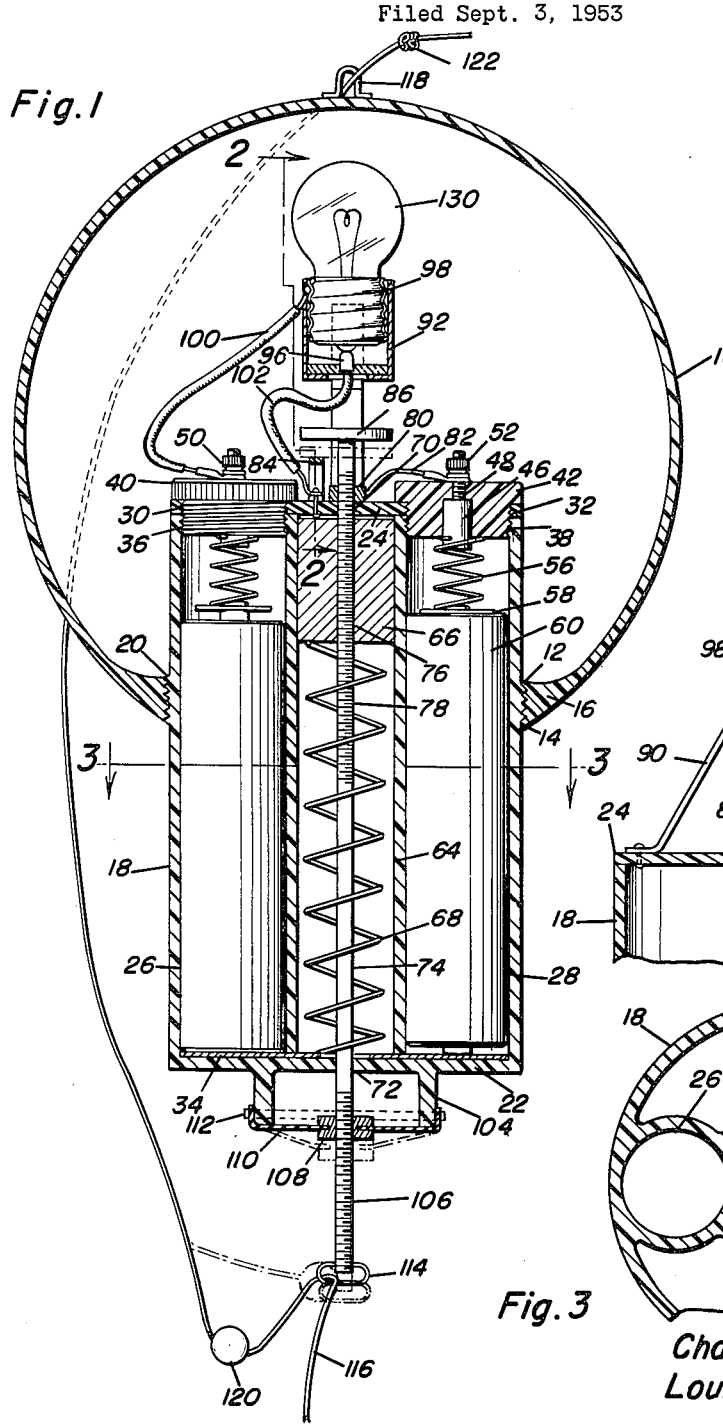
Figure 1 is a vertical sectional elevation through a fishing bobber according to the invention.
Figure 2:
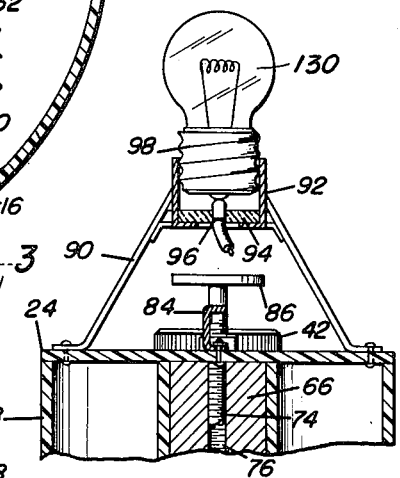
Figure 2 is an enlarged vertical sectional elevation of the lamp mounting and switch terminals taken substantially on the plane indicated by the section line 2—2 of Figure 1; and, Figure 3 is a cross-section through the battery casing and switch housing taken substantially on the plane indicated by the section line 3—3 of Figure 1.
Figure 3:
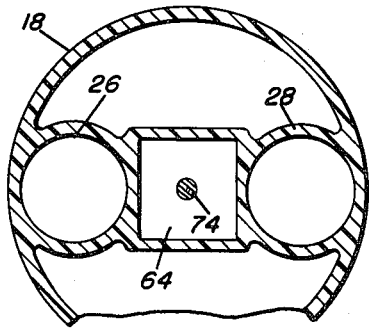

In the exemplary embodiment according to the invention a globular float 10 of light transmitting material is provided with an aperture 12 having threads 14 provided in a thickened lip 16. A combined battery casing and switch housing 18 is substantially tubular in formation and is provided with threads 20 intermediate the ends thereof for engagement with the threads 14 so that the casing 18 may be screwed into threaded engagement with the aperture 12 and preferably in substantially watertight engagement therewith. The casing 18 is provided with an outer end 22 and an inner end 24 preferably rigidly sealed to the side walls of the casing 18 and at least in water-tight engagement therewith. Preferably the outer end 22 is made integral with the side walls of the casing 18 while the inner end 24 may be sealed thereto in any suitable manner.

A pair of substantially tubular battery receptacles 26 and 28 are provided in the casing 18 and the tubes 26 and 28 have openings 30 and 32 through the inner end 24 of the casing.

The battery receptacles 26 and 28 are connected adjacent the outer end of the casing by means of a metallic plate 34 which is preferably molded into the material forming the casing 18 so as to be in substantial water-tight engagement therewith. The openings 30 and 32 are provided with threads 36 and 38 and threaded caps 40 and 42 are provided in threaded engagement with the respective openings and the caps 40 and 42 each carry a terminal comprising an enlarged end portion 46 and a threaded reduced portion 48 preferably embedded within the structure of the material forming the caps 40 and 42 and having terminal nuts 50 and 52 thereon. A contact spring 56 is secured to the enlarged portion 48 of the terminal 46 and carries a contact plate 58 for engagement with the end of a battery cell 60 placed in the compartment.

A longitudinally extending chamber 64 extends axially through the casing 18 and is preferably non-circular in formation although the chamber may be of any desired configuration or may have other means for preventing a spring follower 66 slidably mounted in the chamber 64 from having rotary movement therein. The spring follower 66 has a sliding movement longitudinally in the chamber 64 and a spring 68 mounted between the outer end 22 of the casing 18 and the spring follower 66 for urging the spring follower 66 into contact with the inner end 24 of the casing 18. The inner end 24 of the housing is provided with an axial aperture 70 and the outer end 22 is provided with an axial aperture 72 and a switch rod 74 is slidably engaged in the apertures 70 and 72 and the spring follower 66 is provided with a threaded aperture 76 for engagement with threads 78 on the switch rod 74. A relatively slidable contact 80 is in engagement with the inner end of the switch rod 74 and is connected to the terminal 52 of one of the battery receptacles by means of a conductor 82. An upstanding contact 84 is mounted on the end 24 in spaced relation to the rod 74 and the rod 74 is provided with a bridging member 86 which overlies the upstanding contact 84 and is adapted to make contact therewith.

An upstanding bracket 90 is mounted on the end 24 of the casing 18 and a lamp socket 92 is mounted thereon and is provided with an insulating bottom 94 supporting a central contact 96 while the base 98 of an electric lamp 130 is fixed in the socket 92, said socket being connected by means of a conductor 100 to the opposite battery terminal 50. The terminal 96 is connected by means of a conductor 102 to the upstanding contact 84.

An upstanding rim 104 is mounted on the outer end 22 and is preferably concentric with the aperture 72 through which the rod 74 slides. The outer end of the rod 74 is provided with threads 106 and a nut 108 is threadedly mounted thereon. A diaphragm 110 is connected to the nut 108 preferably vulcanized thereto and is secured in water-tight engagement with the upstanding rim 104 by means of a tension band 112.

The outer end of the rod 74 is provided with a combination line guide and thumb lever 114 for receiving a fishing line 116. A line guide 118 is mounted on the globular float 10 for also receiving the line 116. A bead 120 is mounted on the line 116 for engagement with the line guide 114 and a suitable stop member such as a rubber band 122 is mounted on the line 116 for engagement with the bead 120.

In the operation of the device batteries are provided in the battery chambers 26 and 28 and the line will be engaged with the guides 114 and 118 with the bead 120 being engaged therebetween and the rubber band 122 will be tied on the line 116 in any desired position to give the desired depth of fishing. The bobber will be allowed to slide down to the hook or sinker when making the cast and after the cast has been completed the sinker or the bait weight will cause the line to slide through the guides 114 and 118 and the bead 120 until the rubber band 122 contacts the bead 120 and stops the bead 120 against the guide 114 to determine the depth of fishing.

If the fish is only nibbling at the bait the light will flash on and off but if the fish attempts to swim away with the bait the light will be energized continuously. The rod 74 may be turned through the nut 108 and the spring follower 66 so that the bridging member 86 will be positioned at various heights above the fixed contact 84 so that various sized sinkers or weights may be placed on the line 116 and the heavy weights will have to compress the spring 68 a material distance before the bridging member 86 will engage the upstanding contact 84. This permits adjustment of the device so that it has the substantially same sensitivity to fish bite regardless of the amount of weight supplied in the way of bait or sinker on the line 116.

Obviously, if so desired the material of the float 10 may be colored red, yellow or the like to be more easily observed so that a relatively small lamp 130 will be sufficient to energize the bobber and a small drain will be made on the batteries so that they will last for a long interval of fishing.

For purpose of exemplification a particular embodiment of the invention has been shown and described according to the best present understanding thereof. However, it will be apparent to those skilled in the art that many changes and modifications may be made therein without departing from the true spirit and scope of the invention.

What is claimed as new is as follows:

1. An illuminated fishing bobber comprising a globular float of light transmitting material, said float having a threaded aperture therein, a substantially tubular casing, threads on said casing intermediate the ends thereof for securing said casing in said aperture, inner and outer end members closing the ends of said casing, a pair of battery receiving tubes in said casing, said tubes opening through the inner end member, closures engageable in said openings, battery terminals mounted in said closures, an electric lamp socket including an insulated terminal mounted on said inner end member, a lamp in said socket engaged with the terminal, an axially disposed chamber in said casing, each of said end members having axial apertures therein, a switch rod slidably received in said apertures and extending through said chamber, a spring follower slidably and nonrotatably received in said chamber, biasing means yieldingly urging said spring follower toward said inner end member, said rod being in threaded engagement with said spring follower, a relatively slidable contact in engagement with said switch rod, a conductor connecting said relatively slidable contact to one of said battery terminals, an upstanding contact spaced from said rod, a bridging member carried by said rod and overlying said upstanding contact, a conductor connecting said upstanding contact to the socket terminal, and a conductor connecting the lamp socket to the other battery terminal.

2. An illuminated fishing bobber comprising a globular float of light transmitting material, said float having a threaded aperture therein, a substantially tubular casing, threads on said casing intermediate the ends thereof for securing said casing in said aperture, inner and outer end members closing the ends of said casing, a pair of battery receiving tubes in said casing, said tubes opening through the inner end member, closures engageable in said openings, battery terminals mounted in said closures, an electric lamp mounted on said inner end member, an axially disposed chamber in said casing, each of said end members having axial apertures therein, a switch rod slidably received in said apertures and extending through said chamber, a spring follower slidably and nonrotatably received in said chamber, biasing means yieldingly urging said spring follower toward said inner end member, said rod being in threaded engagement with said spring follower, a relatively slidable contact in engagement with said switch rod, a conductor connecting said relatively slidable contact to one of said battery terminals, an upstanding contact spaced from said rod, a bridging member carried by said rod and overlying said upstanding contact, means comprising conductors electrically connecting the lamp to the upstanding contact and to the other battery terminal, an upstanding rim on said outer end member about said rod, a nut threadedly engaged on said rod, and a diaphragm sealing said nut to said rim.

3. An illuminated fishing bobber comprising a globular float of light transmitting material, said float having a threaded aperture therein, a substantially tubular casing, threads on said casing intermediate the ends thereof for securing said casing in said aperture, inner and outer end members closing the ends of said casing, a pair of battery receiving tubes in said casing, said tubes opening through the inner end member, closures engageable in said openings, battery terminals mounted in said closures, an electric lamp mounted on said inner end member, an axially disposed chamber in said casing, each of said end members having axial apertures therein, a switch rod slidably received in said apertures and extending through said chamber, a spring follower slidably and nonrotatably received in said chamber, biasing means yieldingly urging said spring follower toward said inner end member, said rod being in threaded engagement with said spring follower, a relatively slidable contact in engagement with said switch rod, a conductor connecting said relatively slidable contact to one of said battery terminals, an upstanding contact spaced from said rod, a bridging member carried by said rod and overlying said upstanding contact, means comprising conductors electrically connecting the lamp to the upstanding contact and to the other battery terminal, a line guide on said rod, and means adapted to be placed on a line to engage a line with said line guide.

4. An illuminated fishing bobber comprising: a float including light transmitting material and an elongated chamber, a battery mounted in said float, an electric lamp mounted in said float, means for electrically connecting the battery to the lamp, a non-rotary follower slidable longitudinally in the chamber, said means including a rod, operable in one direction by a fishing line, slidable in the float and threadedly mounted for longitudinal adjustment in the follower, said means further including a relatively slidable contact continually engaging said rod, and a return spring in the chamber engaged with the follower.

References Cited in the file of this patent

UNITED STATES PATENTS

| Number | Name | Date |
|---|---|---|
| 989,145 | Hatchett | Apr. 11, 1911 |
| 1,522,471 | Siino | Jan. 6, 1925 |
| 1,529,949 | Good | Mar. 17, 1925 |
| 2,022,193 | Gaede | Nov. 26, 1935 |
| 2,255,959 | Barber | Sept. 16, 1941 |
| 2,425,825 | Philips | Aug. 19, 1947 |
| 2,492,257 | Barton | Dec. 27, 1949 |